United States Patent [19]

Bianchetta

[11] 4,087,968

[45] May 9, 1978

[54] FLOW CONTROL VALVE FOR COMBINING TWO DISSIMILAR INDEPENDENT SYSTEMS TO A COMMON PRESSURE SOURCE

[75] Inventor: Donald L. Bianchetta, Coal City, Ill.

[73] Assignee: Caterpillar Tractor Co., Peoria, Ill.

[21] Appl. No.: 791,910

[22] Filed: Apr. 28, 1977

[51] Int. Cl.[2] ........................ F15B 13/09; F16H 39/46

[52] U.S. Cl. ........................................ 60/445; 60/452; 60/484; 60/486

[58] Field of Search ................. 60/445, 452, 484, 486, 60/420

[56] References Cited

U.S. PATENT DOCUMENTS

| | | | |
|---|---|---|---|
| 2,892,312 | 6/1959 | Allen et al. ............................ | 60/427 |
| 3,987,626 | 10/1976 | Bianchetta ............................. | 60/445 |

*Primary Examiner*—Edgar W. Geoghegan
*Attorney, Agent, or Firm*—Phillips, Moore, Weissenberger, Lempio & Majestic

[57] ABSTRACT

The invention is concerned with an improvement in a hydraulic fluid system of a vehicle which comprises a variable displacement pump; a first work element; and a device for receiving a first load signal from the first work element and controlling the pump discharge responsive thereto. The improvement includes a plurality of second work elements which receive fluid flow from the pump via a common supply line connected to the first work element, said fluid flow not passing via any independent load responsive delivery system, and a load responsive controller having flow restricting means in a signal line which communicates with the common supply line for sensing a load pressure in the common supply line, said load pressure being a maximum load pressure of any of the second work elements and delivering a second load signal representative of the load pressure to combine with the first load signal to control the discharge of the pump to be responsive to the larger of the first and second load signals.

10 Claims, 1 Drawing Figure

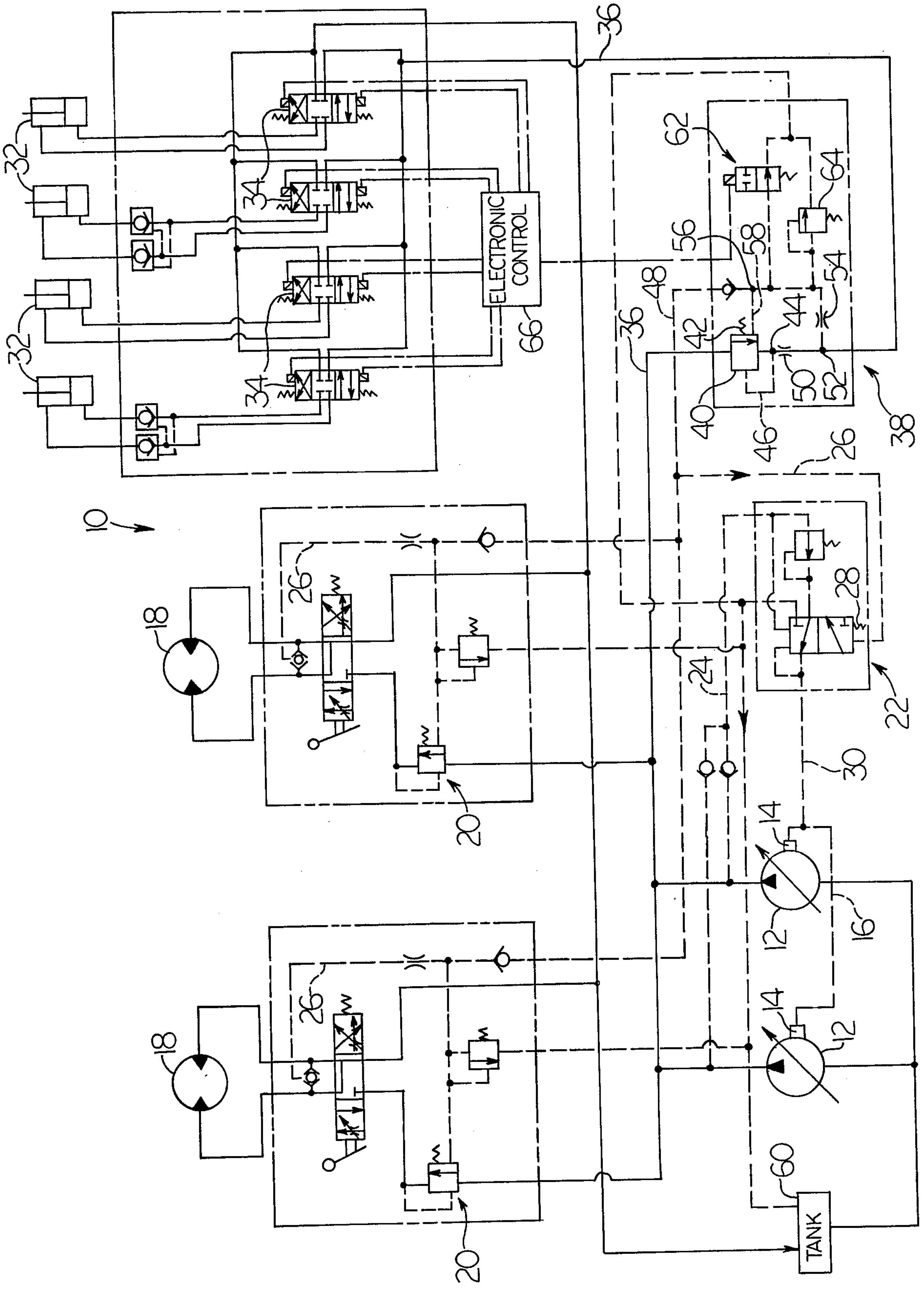
ELECTRONIC CONTROL
TANK
10
12
14
16
18
20
22
24
26
28
30
32
34
36
38
40
42
44
46
48
50
52
54
56
58
60
62
64
66

FLOW CONTROL VALVE FOR COMBINING TWO DISSIMILAR INDEPENDENT SYSTEMS TO A COMMON PRESSURE SOURCE

BACKGROUND OF THE INVENTION

1. Field of the Invention

The invention is concerned with a fluid system of a vehicle which has a load response pump control and control valves that submit load signals back to the pump control in combination with standard control valves that are not load responsive. More particularly the invention is concerned with the addition of a load responsive control valve that allows the standard valves to respond as if they were load responsive. The system is particularly useful with outrigger hydraulic systems wherein the valves on the outrigger cylinder can be of the standard reversing type, and yet they can as a result of the present invention be used with a common variable displacement pump as is used for other systems of, for example, a mobile crane or the like.

2. Prior Art

Hydraulic fluid systems which utilize several valves each of which are load responsive, are known to the prior art. Basically such systems operate via a demand-compensated principle in which the pump discharge power from a variable displacement pump can be made proportional to the instantaneous load demand of one or more fluid motors powered by the pump.

Outrigger hydraulic systems are well known and are usable with mobile cranes and the like as for extending and retracting various hydraulic cylinders to position the outriggers. As is well known in the art, mobile crane outriggers conventionally serve to provide rigid ground support for cranes and the like during their use by appropriate extension and contraction of hydraulic cylinders located at the four corners of a vehicle. Generally each outrigger has a jack cylinder and a beam extension cylinder with appropriate fluid lines connected to each of the cylinders. Conventional reversing valves control the extension and contraction of each cylinder.

Vehicles having an outrigger system would generally include a variable displacement pump and would advantageously have a demand compensated hydraulic system, but such are not compatible with conventional outrigger hydraulic systems which use standard reversing valves. Also, it would significantly increase the cost and increase the complexity of the outrigger reversing valve system if the standard reversing valves were each to be replaced with a control valve that submitted a load signal back to the control of the variable displacement pump. The present invention is concerned with allowing the use of the same variable displacement pumping apparatus which operates, for example, an implement system of a mobile crane to operate the outrigger circuit. What results is demand-compensated hydraulic operation of the outrigger hydraulic system as a whole with a relatively low addition to the complexity of the valving and connections thereof and resulting in relatively low cost and trouble free operation.

SUMMARY OF THE INVENTION

The present invention is directed to overcoming one or more of the problems as set forth above.

According to the present invention an improvement is provided in a hydraulic fluid system of a vehicle having variable displacement pump means serving first work element means and means for receiving a first load signal from said first work element means and controlling the discharge of the pump means in response to the first load signal. The improvement comprises a plurality of second work elements which receive fluid flow from the pump means via a common supply line connected to the first work element means, the fluid flow not passing via any individual load responsive delivery means. Also a part of the improvement is load responsive control means having flow restriction means in a signal line which communicates with the common supply line for sensing a load pressure in the common supply line, said load pressure being a maximum load pressure of any of said second work elements, and delivering a second load signal representative of said load pressure to combine with the first load signal to control the discharge of the pump means to be responsive to the larger of said first and second load signals.

BRIEF DESCRIPTION OF THE DRAWING

The invention will be better understood by reference to the drawing wherein the sole FIGURE illustrates schematically a demand compensated hydraulic system along with an outrigger hydraulic system and load responsive flow control means and associated hydraulic circuitry which allows the outrigger circuit to operate from the same variable displacement pump means as the demand compensated hydraulic system.

DETAILED DESCRIPTION OF THE PREFERRED EMBODIMENT

The FIGURE illustrates a hydraulic fluid system 10 of a vehicle. The hydraulic fluid system 10 includes variable displacement pump means, in the embodiment illustrated, a pair of variable displacement pumps 12, each of the variable displacement pumps 12 having conventional control means 14 which control the displacement thereof responsive to the pressure in an actuator line 16. The variable displacement pumps 12 are the type whereby with increased pressure in the actuator line 16, the displacement of the pumps 12 is decreased. Conventional swash plate variable displacement pumps may be utilized as the pumps 12.

In the embodiment as illustrated, a pair of first work elements 18 each receive fluid at a discharge pressure from a respective one of the pumps 12 via a respective one of a pair of first load responsive delivery valves 20, with the flow via the respective one of the delivery valves 20 being responsive to a pressure of a respective one of the first work elements 18 exceeding a preselected value.

A single signal control means 22 receives a first signal via a first signal line 24 which is determined by the discharge pressure of the pumps 12. The signal control means 22 also receives a second signal via a second signal line 26, which second signal is determined by the maximum pressure of any one of the first work elements 18. Thus, the second signal is the maximum of that developed by either of the pair of first work elements 18. The signal control means 22 includes biasing means 28 which acts in the same direction as the second signal in the second signal line 26 and in opposition to the first signal in the first signal line 24. The signal control means 22 thus alters the first signal in response to the first signal passing through the first signal line 24, the second signal passing through the second signal line 26 and the biasing means 28 and delivers a third signal via a third signal line 30 to the actuator line 16 and thus to the control means 14. The operation of such a system is described in greater detail in Bianchetta U.S. Pat. No. 3,987,626.

The present invention is concerned with operating a plurality of second work elements 32, such as the four outriggers of a mobile crane, the control and hydraulic systems for two of which is illustrated in the drawing from fluid flow supplied by the same pump means, in the particular embodiment illustrated the same variable displacement pumps 12. The improvement is particularly concerned with operating each of the second work elements 32 via a respective standard reversing valve 34 with the fluid flow from the pumps 12 not passing via any independent individual load responsive delivery valve such as the delivery valves 20. This is accomplished through operating all of the second work elements 32 from a common supply path 36 having load responsive control means 38 therein. In the FIGURE the second work elements 32 are shown as being connected in a parallel flow pattern. The improvement of the present invention can also be used if the second work elements are connected in interrupted series.

The load responsive flow control means 38 is located between the pumps 12 and the reversing valves 34 as is clearly illustrated in the drawing. The flow control means 38 detects a load signal in the common supply path 36 which is proportional to a maximum pressure as developed by any one of the second work elements 32. For example, as one of the four outriggers of a mobile crane begins to support the weight of the vehicle there is a large increase in pressure of that particular outrigger which leads to a large increase in pressure in the common supply path 36 which is detected as a load signal by the load responsive control means 38. The flow control means 38 includes means for reducing flow from the pumps 12 through the common supply path 36 to the reversing valves 34 responsive to the aforementioned load signal exceeding a predetermined value. In the embodiment illustrated in the drawing, the flow reducing means comprises a modulating flow control valve 40 which is biased normally open by biasing means 42 and which modulates responsive to pressure at a first point 44 in the common supply path 36 which is on the reversing valve side of the modulating flow control valve 40, which pressure is delivered via a conduit 46 to overcome the biasing means 42 of the modulating flow control valve 40 and shift said modulating control valve 40 towards a closed position.

The load responsive flow control means 38 also includes means for delivering the load signal to the signal control means 22 as via a fourth signal line 48 as a fourth signal. The fourth signal line 48 joins with the respective second signal lines 26, all via one-way check valves as illustrated, whereby the maximum of the pressure within the second signal lines 26 and the fourth signal line 48 is applied to the signal control means 22 to act additively to the biasing means 28 thereof. The load responsive flow control means 38 generally includes pressure reducing means, generally a first restricted orifice 50, between the first point 44 in the common supply path 36 and the reversing valves 34. The fourth signal line 48 senses pressure at a second point 52 in the common supply path 36 which second point 52 is between the first orifice 50 and the reversing valves 34. Pressure and flow reducing means, in the embodiment illustrated a second restricted orifice 54, is provided in the fourth signal line 48 between the second point 52 in the common supply path 36 and a branch point 56 in the fourth signal line 48 from which the fourth signal line 48 proceeds to the signal control means 22 and from which a branch conduit 58 proceeds to the modulating flow control valve 40 to act along with the biasing means 42 thereof. Thus, the modulating flow control valve 40 has flow modulated by the difference between the pressure at the first point 44 in the common supply path 36 and the sum of the biasing means 42 of the modulating control valve 40 and the pressure at the branch point 56 in the fourth signal line 48.

Means are provided for normally venting the signal that supplies the signal line 48, i.e., the signal at the branch point 56, thus allowing the pumps 12 to work at minimum displacement. Because of the restricted nature of the orifice 54 only a small flow can proceed therethrough from the common supply path 36 to a sump 60. In the particular embodiment illustrated the venting means comprises a normally open vent valve 62 which is connected to vent the fourth signal line 48. Thus, it is clear that only when the vent valve 62 is closed can the second work elements 32 be operated.

Pressure relief means, in the embodiment illustrated a pressure relief valve 64 which is normally biased closed is provided in communication with the fourth signal line 48. Pressure in the fourth signal line 48 is used to oppose the biasing of the pressure relief valve 64 and to open said pressure relief valve 64 when a predetermined pressure has been reached in the fourth signal line 48. Thus, the pressure relief valve 64 sets the maximum pressure within the fourth signal line 48.

The reversing valves 34 and the vent valve 62 are very preferably operated substantially simultaneously. In operation this is accomplished by making each of these valves solenoid operated and by providing electronic control 66 which is conventionally wired so that whenever any one of the reversing valves 34 is open, the vent valve 62 is substantially simultaneously closed.

Operation

A pair of first work elements 18 operate in a well known manner under pressure supplied thereto via the variable displacement pumps 12. Via the second signal line 26, a second signal is delivered responsive to the maximum pressure in the first work elements 18 to the signal control means 22 wherein said second signal adds to the force of a biasing means 28 of the signal control means 22. As previously mentioned, the signal control means 22 likewise receives a first signal via a first signal line 24 which is representative of the pressure developed by the pumps 12. Thus the modulation of the signal control means 22 is determined by the relative size of the first and second signals and the strength of the biasing means 28. When the second work elements 32 are to be used the electronic control 66 is operated to open at least one of the reversing valves 34. This at the same time closes the vent valve 62. Pressure which has been venting via the vent valve 62 now builds up within the common supply path 36 after passing through the modulating flow control valve 40 and is delivered to one or more of the work elements 32. As pressure builds up in any one of work elements 32 this pressure is delivered via the fourth signal line 48 as a fourth signal or load signal to the signal control means 22. Thus, the signal control means 22, when the second work elements 32 are operating, balances the biasing means 28 plus the larger of the second signal and the fourth signal against the first signal (which is proportional to the pressure being developed by the pumps). Modulation or feathering of the signal control means 22 thus occurs leading to a third signal in the third line 30 which is delivered to the control means 14 of the pumps 12 thereby controlling the displacements thereof. When the pressure within the fourth signal line 48 reaches a predetermined value the pressure relief valve 64 opens thus determining a maximum pressure value within the fourth signal line 48. The second orifice 54 is so restricted in size whereby while the pressure relief valve 64 reduces the pressure in the fourth signal line 48, only a small amount of fluid is actually flowed therethrough thus preventing a massive venting of fluid to the tank or sump 60. Thus, the signal control means 22 and the variable displacement pumps 12 through use of the load responsive flow control means 38 are made usable with the plurality of second work elements 32 and the plurality of simple reversing valves 34. Further, the signal control means 22 continues to operate in the aforementioned load compensated manner.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. In a hydraulic fluid system of a vehicle having variable displacement pump means serving first work element means and means for receiving a first load signal from said first work element means and controlling the discharge of the pump means in response to the first load signal; an improvement comprising:

a plurality of second work elements which receive fluid flow from said pump means via a common supply line connected to said first work element means, said fluid flow not passing via any individual load responsive delivery means; and load responsive control means having flow restricting means in a signal line which communicates with the common supply line for sensing a load pressure in the common supply line, said load pressure being a maximum load pressure of any of said second work elements, and delivering a second load signal representative of the load pressure to combine with the first load signal to control the discharge of the pump means to be responsive to the larger of said first and second load signals.

2. An improvement as in claim 1, wherein the load responsive control means includes a relief valve in communication with the signal line for controlling a maximum pressure of said second load signal.

3. An improvement as in claim 2, including check valve means between said relief valve and said first load signal receiving means preventing said first load signal from venting via said relief valve.

4. An improvement as in claim 1, wherein a two way solenoid valve is in communication with the signal line for allowing the signal line to be open to a sump or blocked in response to operation of the plurality of second work elements.

5. An improvement as in claim 1, further comprising a flow control modulating valve in the common supply path for controlling the amount of flow delivered to the plurality of second work elements.

6. An improvement as in claim 1, wherein said first work element means comprises a plurality of first work elements and said first load signal comprises a maximum load signal developed by any one of said first work elements.

7. In a hydraulic fluid system of a vehicle which comprises variable displacement pump means; control means for said pump means; a first work element receiving fluid at a discharge pressure from said pump means via first load responsive delivery valve means responsive to a pressure of said first work element exceeding a preselected value; signal control means receiving a first signal determined by said discharge pressure and a second signal determined by said first work element pressure and including biasing means, said signal control means altering said first signal in response to said first signal, said second signal and said biasing means and delivering a third signal to said pump means control means to responsively vary the displacement of said pump means; an improvement comprising :

a plurality of second work elements which receive fluid flow, each via respective reversing valve means from said pump means which fluid flow does not pass via any individual load responsive delivery means;

load responsive flow control means between said pump means and said plurality of reversing valve means, said flow control means detecting a load signal proportional to a maximum pressure developed by any one of said second work elements and including means for reducing flow from said pump means through a common supply path therefrom to said plurality of reversing valve means responsive to said load signal exceeding a predetermined value and means for delivering said load signal to said signal control means to combine with said second signal whereby said third signal is altered responsive to said first signal, said biasing means and the larger of said second signal and said load signal to produce said third signal;

means for normally venting said load signal to sump;

means for selectively opening and closing any one of said reversing valve means and blocking said venting means substantially simultaneously with the opening of any one of said reversing valve means.

8. In a hydraulic fluid system of a vehicle which comprises variable displacement pump means; control means for said pump means; a first work element receiving fluid at a discharge pressure from said pump means via said first load responsive delivery valve means responsive to a pressure of said first work element exceeding a preselected value; signal control means receiving a first signal determined by said first work element pressure and a second signal determined by said first work element pressure and including biasing means; said signal control means altering said first signal in response to said first signal, said second signal and said biasing means and delivering a third signal to said pump means control means to responsively vary the displacement of said pump means; an improvement comprising;

a plurality of second work elements which receive fluid flow each via respective reversing valve means from said pump means, which fluid flow does not pass via any individual load responsive delivery valve means;

load responsive flow control means between said pump means and said plurality of reversing valve means comprising:

(1) a flow control modulating valve in a common supply path from said pump means to said reversing valve means, (2) means biasing said modulating valve normally open, (3) means responsive to pressure at a first point in said common supply path on a reversing valve side of said modulating valve for overcoming said modulating valve biasing means and shifting said modulating valve towards a closed position, (4) first pressure reducing-flow limiting means in said common supply path between said first point and said reversing valve means, (5) a first signal line for sensing pressure at a second point in said common flow path between said first reducing means and said reversing valve means and delivering a fourth signal responsive to said sensed pressure to combine with said second signal at said signal control means, (6) a second signal line for sensing pressure at said second point and delivering said fourth signal from said first signal line responsive to said sensed pressure to said modulating valve additively to said modulating valve biasing means, (7) second pressure reducing-flow limiting means intermediate said second point and both said modulating valve and said signal control means causing said fourth signal to be reduced from a pressure thereof at said second point, (8) pressure relief means communicating with said first signal line for venting pressure therein to a sump when said pressure reaches a preselected value;

normally open vent valve means communicating said fourth signal with a sump;

means for selectively opening and closing any one of said reversing valve means and substantially simultaneously closing said vent valve means with the opening of any one of said reversing valve means.

9. An improvement as in claim 8, including check valve means in said first signal line preventing flow therethrough towards said second point.

10. An improvement as in claim 9, wherein said reversing valve means and said vent valve means are each actuated by solenoids and said reversing valve means and vent valve means opening and closing means comprises electronic control means which control said solenoids.

* * * * *